April 30, 1963

J. A. BECKER 3,088,029

RADIANT ENERGY TRANSLATING DEVICE

Filed Nov. 16, 1949

INVENTOR
J. A. BECKER

BY

ATTORNEY

April 30, 1963  J. A. BECKER  3,088,029
RADIANT ENERGY TRANSLATING DEVICE
Filed Nov. 16, 1949  2 Sheets-Sheet 2
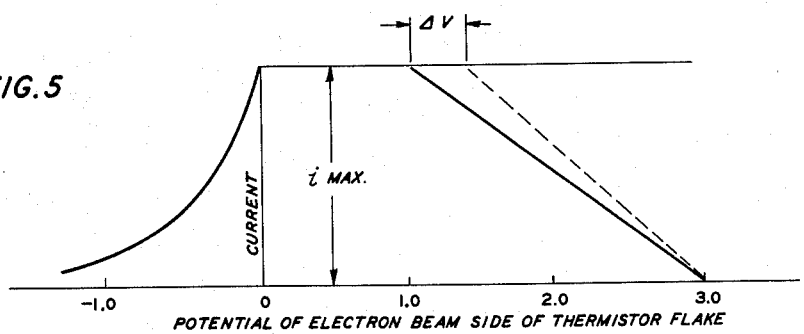
FIG. 5
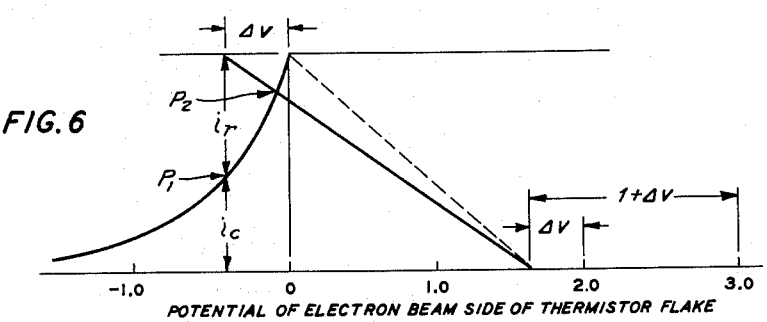
FIG. 6
FIG. 7
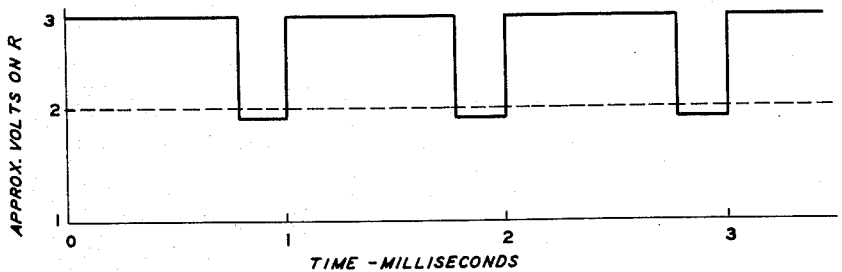
INVENTOR
J. A. BECKER
BY
ATTORNEY United States Patent Office 3,088,029
Patented Apr. 30, 1963

3,088,029
RADIANT ENERGY TRANSLATING DEVICE
Joseph A. Becker, Summit, N.J., assignor to Bell Telephone Laboratories, Incorporated, New York, N.Y., a corporation of New York
Filed Nov. 16, 1949, Ser. No. 127,707
3 Claims. (Cl. 250—71)

This invention relates to radiant energy translating devices and more particularly to electron image devices or tubes for producing a visual representation of radiations from a distant panorama.

Electron image devices for producing a visual representation of radiation from a distant panorama have been suggested heretofore, such devices utilizing a detecting electrode of photoconductive material. However, the sensitivity of such devices is quite small being in a typical case such that temperature differences of less than 150° C. between objects in the panorama could not be distinguished, the distance of the panorama from the detecting electrode being unimportant as long as the size of the panorama increases as the square of the distance. Furthermore, detecting electrodes of photoconductive material are difficult to produce with uniformity and in addition are subject to fatigue.

One general object of this invention is to improve radiant energy translating devices. More specific objects of this invention are to increase the sensitivity of electron image tubes, enhance the over-all performance thereof and facilitate the attainment of uniform and constant operating characteristics.

In accordance with one feature of this invention, a thermally sensitive conductive element, specifically a thin flake of material having a high temperature coefficient of resistance, is utilized as the detecting element or electrode to obtain a heat picture of the panorama. Thermally sensitive conductive elements of the type contemplated by this invention are frequently referred to as thermistors. Typical of such elements which may be utilized in devices constructed in accordance with this invention are those disclosed in the application Serial No. 127,715 filed November 16, 1949 of H. Christensen.

In one illustrative embodiment of this invention, a radiant energy translating device comprises a cathode-ray tube having therein a thermistor flake upon which radiation from the panorama is focussed. Such a flake is highly sensitive to heat radiation including infra-red radiations of the longer wavelengths. The thermistor flake produces a temperature picture of the panorama which is converted into a potential picture and the latter is converted into an electron image portrayed on a fluorescent screen of the tube.

The invention and the above-noted and other features thereof will be understood more clearly and fully from the following detailed description with reference to the accompanying drawing in which:

FIGS. 5 and 6 are charts showing the relationship between potential applied between the back surface of the thermistor flake and the cathode and the current flowing through the thermistor flake; and FIG. 7 illustrates a typical rectangular voltage train which may be applied to the thermistor element in one manner of operation of the device.

Figure 1:
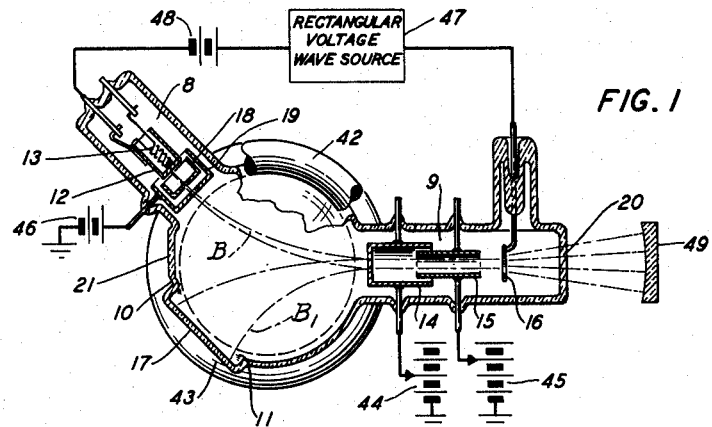
FIG. 1 is in part a view in section of a cathode-ray device and in part a circuit schematic depicting a radiant energy translating device illustrative of one embodiment of this invention wherein electromagnetic focussing of the electron streams is utilized.

Referring now to the drawing, the electron image tube illustrated in FIG. 1 comprises an evacuated enclosing vessel having four pockets, 8, 9, 10, and 11, therein. In pocket 8 is an electron gun which comprises a heater coil 13, an equipotential cathode 12 and two accelerating and focussing electrodes 18 and 19 to form the electron beam. The electron beam indicated at B, accelerated by a voltage from the source 46, of about 4,000 volts, is directed into pocket 9 by a magnetic field generated by coils 42 and 43 positioned in such a manner as to have the lines of force pass normally to the drawing plane of FIG. 1. In pocket 9 there are two concentric metal cylinders 14 and 15 to which positive potentials of from 0 to 50 volts are applied by means of voltage supplies 44 and 45 respectively. Element 16 is a thermistor flake constituting a detecting and reflecting electrode which will be described in detail later. Element 48 is a small potential source. Pocket 9 is closed by a glass window 20 through which the heat images to be converted are projected onto the detecting and reflecting electrode 16. The heat images are focussed by optical means 49. The window 21 in pocket 10 serves the same purpose as does window 20. In pocket 11, a fluorescent screen 17 is mounted, onto which the electrons reflected from thermistor 16 are directed by the influence of the magnetic field, the streams being indicated at $B_1$. Element 47 is a rectangular voltage wave source to be applied between the cathode and the back of element 16 for reasons to be discussed later. The device is highly evacuated by a mercury diffusion pump, for example, and then sealed off from the pump.

Figure 4:
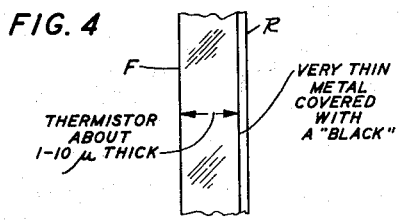
FIG. 4 is a fragmentary view to a greatly enlarged scale of a thermistor flake which may be included as the sensitive element in devices of the construction shown in FIGS. 1, 2 and 3.

A segment of detector electrode 16 is shown in detail in FIG. 4. It has a front surface F which is bare and a back surface R which is coated first with a thin metallic conducting layer of platinum for example, of a thickness of approximately one-tenth micron or less. This conducting layer is coated with a blackening agent such as carbon to insure absorption of the maximum amount of infra-red rays. The over-all dimensions of the thermistor flake are approximately 1 micron thick and of the order 1 to 9 square centimeters in area. It is a well-known characteristic of thermistors that they possess a large negative temperature coefficient of resistance and therefore will have a decreasing resistance with an increase in temperature. It is to be noted however, that an element having a high positive temperature coefficient of resistance could be utililized as a detecting electrode 16.

Generally, fabrication of the thermistor flake involves the following procedure: (1) obtain a foil of the thickness desired by any known method, such as electroplating, evaporation or rolling process. Foils may be produced of uniform thickness of from a fraction of a micron and thicker by the proper choice of the aforementioned methods; (2) weld this foil to a frame; (3) rapidly heat the assembly in a reducing atmosphere furnace to a proper minimum temperature and maintain this temperature until the foil becomes flat.

More specifically, a frame-welded nickel foil is placed in a cold oven which is then heated slowly enough so that the ring and the foil expand thermally at an equal rate. For a foil one micron thick welded to a frame ten mils thick, the furnace should be allowed to heat up to 450 degrees Centigrade in one hour. An oxidizing atmosphere is then forced into the furnace and the heating up of the furnace is continued at a rate of about 400 degrees Centigrade per hour, at which time the foil will be completely oxidized. A probe is then used to sever the foil from the frame along the perforations.

The operation of the thermistor flake 16 will now be described. An infra-red image is focussed on either side of the thermistor flake by means of a mirror arrangement such as element 49. Let us assume for purposes of discussion that the heat image of uniform intensity is focussed on the back of the thermistor, that is, the surface opposite that which is struck by the electron beam B. Let us further assume that a potential from source 48 of +3 volts is applied to the back surface of the thermistor with respect to the cathode 12. Then looking at FIG. 5, it can be seen that if the electron beam current $I_{max}$ is zero, the front surface of the thermistor flake 16 is also at a potential of +3 volts with respect to the cathode. If, however, an electron beam is present to complete the circuit, there will be a current flow through the thermistor flake limited either by the thermionic emission of the cathode or by the potential gradient existing between the cathode and front surface F of the thermistor flake, the latter limitation in turn being controlled to some extent by the work functions of the cathode and thermistor flake.

Assuming the electron beam current to be $2 \times 10^{-6}$ amps./cm.$^2$, the resistance of the thermistor flake material being $10^6$ ohms, and the area of the thermistor flake equal to 1 square centimeter, the voltage drop through the thermistor will be equal to 2 volts. The entire front surface of the thermistor will now be 1 volt positive with respect to the cathode and the current would be thermionically limited, assuming the heat radiation of the panorama to be uniform. There will be no reflected current $I_r$, since all the electrons in the beam will be absorbed by the thermistor flake. If an object hotter than the surrounding panorama is now placed in the panorama, the infra-red radiation from this object will be focussed by means of the aforementioned mirror arrangement upon some spot of the thermistor and will heat this portion of the thermistor to a temperature $\Delta T$ greater than the temperature of the remainder of the thermistor. This increase in temperature will cause the resistance of that portion of the thermistor to become $\Delta R$ less than the resistance of any other corresponding area of the thermistor. Then the voltage drop across the thermistor at the spot corresponding to the heated object in the panorama will be $\Delta V$ volts less than voltage drop across the remainder of the thermistor flake. However, since the back surface of the thermistor is coated with a conducting material, the $\Delta V$ differential will appear on the front surface of the thermistor. Thus, the hot object in the panorama has been transformed into a heat picture and subsequently has been transformed into a potential picture, the potential of the spot appearing on the front surface of the thermistor flake and corresponding in position to the hot object on the panormaa being $\Delta V$ volts less than the remainder of the front surface of the thermistor flake.

With the structure thus far described, this potential picture cannot be transformed into an intensity image on a fluorescent screen, since the potential of the front side of the thermistor flake is still positive with respect to the cathode and all the electrons in the electron beam will be absorbed by the thermistor flake, leaving none to be deflected to the fluorescent screen.

Let us now consider what happens to the electron beam currents when the potential of the back surface of the thermistor flake is suddenly shifted to the left (in a negative direction) in FIG. 5 by an amount such that the potentials on the front surface of the thermistor flake are just in the negative region. More specifically, in FIG. 5 shift the potentials to the left by $1 + \Delta V$ volts. There is then a situation like that shown in FIG. 6. The back surface R of the thermistor flake will be at $(2 - \Delta V$ volts). The front surface F of the thermistor flake will have a different potential for the object image region than for the panorama region. The object image region will be at zero potential; substantially all the electrons reaching it will still be collected ($I_{max}$) and none will be reflected. The panorama region will be at a potential $-\Delta V$ or at point $P_1$ in FIG. 6 and only the unreflected current $I_c$ will be collected. The difference $I_{max} - I_c$ = reflected current $I_r$ will be reflected and will form a bright image on the fluorescent screen. Hence, the picture on the screen will be a photographic negative of the heat picture falling on the thermistor flake 16. It is to be noted that even though the panorama region is negative with respect to the cathode all of the electron beam current is not reflected. This is due to the work functions of the two surfaces and electric field gradient produced by the beam electrons near the thermistor flake.

The potential picture will not stay in the above condition but will approach a new steady state in which the panorama potential will correspond to point $P_2$, the intersection of the panorama resistance line and the characteristic line of the thermistor flake. Hence, $\Delta V$ after a time interval will still be negative but considerably smaller than the $\Delta V$ immediately after shifting the potential. The rate at which the panorama potential changes from $P_1$ to $P_2$ will depend on the resistance-capacity time constant of the thermistor film. For the condition chosen, this is of the order of a millisecond so that the potential of the back surface of the thermistor flake should be kept at its negative value for something like one-quarter millisecond and at its positive value for something like three-quarter millisecond. The potential of the back side of the thermistor as a function of a time would then look something like that shown in FIG. 7. The application of this rectangular voltage shown in FIG. 7 will keep the $\Delta V$ considerably nearer $P_1$ than $P_2$ with a consequent higher mean reflected current $I_r$ to the phosphorescent screen which will, of course, result in the greater sensitivity and a brighter image on the fluorescent screen 17.

It is to be noted that the distributions of potentials as shown in FIGS. 5 and 6 are not necessarily the most ideal ones in every instance. Some thermistor flakes have characteristic curves different from those shown in FIGS. 5 and 6 which might necessitate having even the most positive portion of the front side of the thermistor flake negative with respect to the electron beam source. Stated differently, the objective is to obtain the greatest contrast in reflected current $I_r$ for variations in temperature of various portions of the thermistor flake, and due to differences of circuit and thermistor flake characteristics this can best be accomplished by adjustment of the system during operation.

Figure 2:
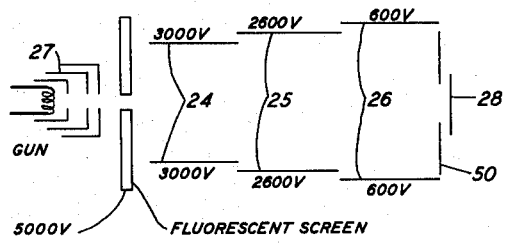
FIGS. 2 and 3 illustrate other embodiments of this invention wherein electrostatic focussing of the electron beams is employed.

FIG. 2 shows a somewhat different embodiment of the invention utilizing the electrostatic focussing of the beam rather than magnetic focussing as is used in the embodiment shown in FIG. 1. The means by which the electrostatic cylindrical plates 24, 25, 26 can be adjusted to focus an electron beam emitted from constant potential cathode 27 upon thermistor flake 28 is well known in the art and needs no further explanation herein. Typical operating voltages are indicated in the figure. The operation of thremistor flake 28 is exactly the same in FIG. 2 as it is in FIG. 1 and the discussion incident to FIGS. 4, 6 and 7 pertains to FIG. 2 equally as well as it pertains to FIG. 1.

Figure 3:
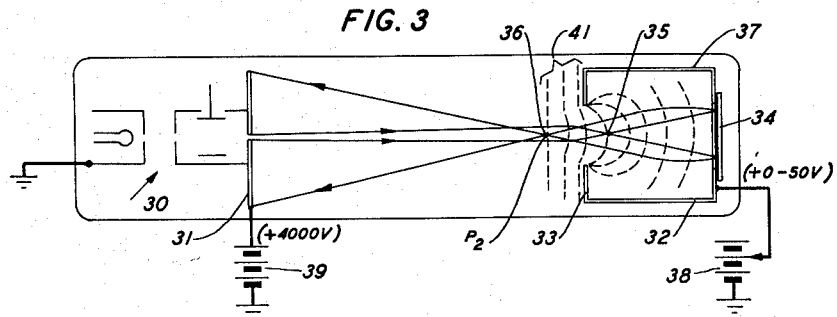

A third embodiment of the invention is illustrated in FIG. 3 which also utilizes an electrostatic means for focussing the electron beam on the thermistor and also for focussing the reflected current $I_r$ back upon the fluorescent screen 31. It comprises the cathode system 30, the fluorescent screen 31, the projection system 32 with diaphragm 33, and the thermistor flake 34. In the picture, the quantitative distribution of the equipotential planes such as 41, the projection system, and the path of the rays before and after the reflection can be seen. Through the hole in the center of the screen 31 a narrow electron beam enters the counter field between screen 31 and diaphragm 33. There the beam diverges somewhat. The beam must be narrow so that its cross section in the plane of the diaphragm 33 is smaller than the opening in 33, otherwise some electrons will hit the diaphragm 33 and the secondary electron emission would disturb the screen image. The collecting action of the diaphragm opening focusses the ray first at point 35. Finally, the slightly divergent electron beam hits the detecting electrode. After reflection, it falls again under the collecting influence of diaphragm 33, and then is focussed again at point 36, and then hits the screen 31. Due to the weak electron optic defraction mirror existing immediately in front of the thermistor detecting electrode 34, the reflected electrons fall partly on the peripheral zone of diaphragm 33, which may cause a spherical error which can be noticed by a three-dimensional effect of the image.

The electron optical magnification is approximately 10. It depends much on the diameter of the diaphragm 33, i.e., it increases with decreasing diameter. The weak field in front of the detecting electrode 34 is obtained by making the projection system in the form of a cage 37, and by applying a low potential from source 38 (0 to 50 volts) to it. The diaphragm 33, which is at the same potential as 37, causes the projection of the reflected electrons, and reduces the influence of the high screen potential of the detecting electrode.

It is important that the influence of the high screen potential source 39 on the detecting electrode 34 be either eliminated or considerably reduced. The reason why this is important is because the magnitude of the intensity difference on the fluorescent screen depends on the potential differences of the corresponding points on the mirror electrode. These potential differences are small and their influence on the path of the electrons will also be small if the potential gradient in front of the detecting electrode is of large magnitude. It must be endeavored, therefore, to obtain as small potential gradients as possible near the detecting electrode. In the electron mirror image tube shown in FIG. 2, a potential gradient of approximately 1,000 volts per centimeter exists in front of the thermistor electron mirror 28. This means that the distance between two equipotential surfaces of one-tenth volt potential difference amounts to only one micron. If, however, in FIG. 3 the field strength is reduced in front of the electrode to one one-hundredth the former value, the distance between equipotential surfaces will be one-tenth millimeter and all potential gradients will be approximately 100 times smaller. This in turn will cause an important increase in contrast of the screen image. In other words the decrease in potential gradient in front of the thermistor electrode 34 allows a small difference in voltage on the surface of the mirror electrode to exert a proportionately larger influence on the shape of equipotential surfaces of the electric field in front of the detecting electrode than if said potential gradient were of a larger magnitude. Furthermore, another important gain is obtained by diminishing the field strength in front of the detecting electrode 34. The mechanical unevenness of the mirror electrode which in prior art devices can be noticed as disturbing spots on the screen cannot influence the picture as much if the field is weaker. Concluding, one may say that a diminution of the field strength in front of the mirror electrode may cause the following advantages:

(1) Increases in sensitivity.
(2) Diminution of the influence of surface structure on the image. The cage 37 provides such a diminution of the field strength in front of the mirror electrode 34.

This embodiment of the thermistor electron image tube is capable of detecting a .005 voltage differential on the surface of the thermistor flake. A 1° C. change in temperature of the thermistor flake will produce a change of $\Delta V$ equal .005 volt. Since a one-degree difference between an object and the surrounding panorama will produce a change in temperature of .1° C. on the thermistor flake, it follows that the thermistor electron image tube can detect temperature differentials in the panorama as small as 1° C.

What is claimed is:

1. An electrical apparatus for producing a visual picture of infra-red radiating objects in a panorama, comprising a thin sheet of thermistor material sensitive substantially only to thermal energy and substantially insensitive to photon energy, the resistivity of incremental areas of which varies in accordance with the intensity of infra-red radiation incident thereon, means for focussing infra-red radiations from the panorama upon a first face of said thin sheet, means comprising a cathode for directing an electron beam upon the second face of said thin sheet, said first face of said thin sheet being coated with a thin layer of conducting material, means for biasing said first face positive relative to said cathode, means for applying an intermittent negative voltage to said first face to cause the greatest possible difference between the portion of the electron beam reflected from the hottest portion of said thin sheet and the portion of the electron beam reflected from the coldest portion of the said thin sheet, said intermittent current having a frequency determined by the dissipation time constant of the natural capacitance and resistance of said thin flake, and means to collect electrons reflected from said second surface.

2. An electrical apparatus for producing visual images of the heat radiations of objects in a panorama comprising an electron gun, a cathode in said gun, a thermally sensitive conductive flake substantially insensitive to photon energy as the target for said gun, a viewing screen, electrostatic means to accelerate and focus the electron beam from said electron gun upon a first surface of said flake, a conducting layer upon the second surface of said flake, means for biasing said second surface slightly positive with respects to said cathode, means for applying an intermittent voltage to said second surface of such a magnitude and polarity that the potential of any given portion of the said first surface of said flake at a given temperature will just absorb all the electrons of the electron beam current striking that portion, said intermittent voltage being applied by said means at a frequency determined by the capacitance and resistance characteristics of the thermistor flake, electrostatic means to impinge and focus upon the said viewing screen the electrons of the electron beam reflected from said flake target, and optical means to focus the heat radiation of the panorama upon said thermally sensitive conductive flake.

3. An electrical device comprising an electron gun including a cathode, a target, a viewing screen, means to focus said electron gun upon said target, means to focus the part of the electron gun electron beam reflected from said target, said target comprising a thermistor flake substantially sensitive only to thermal energy and being composed of a material having a large temperature coefficient of resistance and having a thin flake physical shape, one surface of said flake being exposed towards said electron tube and said viewing screen, the other surface of said flake being coated with a conducting material and also being exposed to a panorama, said flake further being sensitive to infra-red radiation from said panorama, and means for applying an intermittent voltage to said other face to bias it with respect to said cathode, the applied voltage being of such magnitude as to cause any portion of said first surface at a given temperature to reflect only a small fraction of the electron beam current impinging thereon so that any other portion of the thermistor flake which is at a lesser temperature will have a more negative potential on the corresponding portion of said surface and will therefore reflect a much larger portion of the electron beam current focussed thereon.

References Cited in the file of this patent

UNITED STATES PATENTS 2,199,438    Lubszynski    May 7, 1940
2,414,792    Becker    Jan. 28, 1947

(Other references on following page)

OTHER REFERENCES

The Electron Mirror Image Tube, by Harry Dauber, PB11,175, Fiat Report No. 702, 42 pages, January 16, 1946.

The Production of Film Type Bolometers With Rapid Response, by C. B. Aiken et al., The Review of Scientific Instruments, vol. 17, No. 10, October 1946, pp. 377–385.

Nature, vol. 161, No. 4086, February 21, 1948, pp. 281 and 282.

Physics for Technical Students, by W. B. Anderson, published by McGraw-Hill Book Company, Inc., New York, 1937.

Electronic Engineering, Oct. 1946, by Krizek & Vand, pp. 316, 317 and 322.